(12) United States Patent
Weber et al.

(10) Patent No.: US 11,126,608 B2
(45) Date of Patent: Sep. 21, 2021

(54) TECHNIQUES AND ARCHITECTURES FOR PARTITION MAPPING IN A MULTI-NODE COMPUTING ENVIRONMENT

(71) Applicant: salesforce.com, inc., San Francisco, CA (US)

(72) Inventors: Robert Weber, Laguna Hills, CA (US); Prateek Mathur, Union City, CA (US); Pratheesh Ezhapilly Chennen, Union City, CA (US); Sachin Mody, San Ramon, CA (US); Ganesh Maganti, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 281 days.

(21) Appl. No.: 15/885,654

(22) Filed: Jan. 31, 2018

(65) Prior Publication Data
US 2019/0236174 A1 Aug. 1, 2019

(51) Int. Cl.
*G06F 16/22* (2019.01)
*G06F 16/21* (2019.01)

(52) U.S. Cl.
CPC ......... *G06F 16/2291* (2019.01); *G06F 16/21* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

Korf, Richard E., "Multi-Way Number Partitioning", Proceedings of the Twenty-First International Joint C,onference on Artificial Intelligence (IJCAI-09), pp. 538-543.

*Primary Examiner* — Richard L Bowen
(74) *Attorney, Agent, or Firm* — Jaffery Watson Mendonsa & Hamilton LLP

(57) ABSTRACT

Mapping of database partitions to available nodes. Metric information related to the partitions of the database are stored. One or more metrics associated with the partitions are gathered. A plurality of potential mappings of partitions to nodes are evaluated. One of the potential mappings of partitions to nodes to result in improved metric distribution among the nodes and the partition moves are within a pre-selected move constraint is selected. The selected potential mapping is implemented by moving one or more partitions between one or more nodes.

24 Claims, 11 Drawing Sheets

(56) References Cited

U.S. PATENT DOCUMENTS

| | | | |
|---|---|---|---|
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 7,685,109 B1 * | 3/2010 | Ransil | G06F 11/1446 707/999.003 |
| 7,925,756 B1 * | 4/2011 | Riddle | H04L 47/10 709/226 |
| 9,053,167 B1 * | 6/2015 | Swift | G06F 16/27 |
| 9,489,443 B1 * | 11/2016 | Muniswamy-Reddy | G06F 16/278 |
| 10,102,086 B2 * | 10/2018 | Cai | G06F 11/2058 |
| 10,592,153 B1 * | 3/2020 | Subramaniam | G06F 3/067 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Rak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0177744 A1 | 7/2009 | Marlow et al. | |
| 2009/0260016 A1 * | 10/2009 | Ramakrishnan | G06F 9/5083 718/105 |
| 2013/0290249 A1 * | 10/2013 | Merriman | G06F 16/278 707/610 |
| 2013/0332484 A1 * | 12/2013 | Gajic | G06F 16/21 707/770 |
| 2015/0134626 A1 * | 5/2015 | Theimer | G06F 16/21 707/693 |
| 2015/0319234 A1 * | 11/2015 | Wang | G06F 9/5083 709/226 |
| 2016/0004571 A1 * | 1/2016 | Smith | G06F 16/285 718/105 |
| 2018/0089262 A1 * | 3/2018 | Bhattacharjee | G06F 16/3334 |
| 2018/0253467 A1 * | 9/2018 | Gurajada | G06F 11/1471 |

* cited by examiner

TECHNIQUES AND ARCHITECTURES FOR PARTITION MAPPING IN A MULTI-NODE COMPUTING ENVIRONMENT

TECHNICAL FIELD

Embodiments relate to techniques for managing distribution of workloads and/or resource consumption in a multi-node environment. More particularly, embodiments relate to techniques for more effectively determining optimal distribution of workloads and/or resource consumption in a multi-node computing environment.

BACKGROUND

Multitenant environments can be complex to manage as the number of tenants increases and the demands on the infrastructure increase and/or become more complex. To provide a good user experience the workloads and/or resource consumption should be generally evenly distributed to provide the best overall performance. However, in systems that have multiple nodes as well as multiple partitions within nodes that can support multiple organizations/tenants, monitoring and management of resources and workload distribution can be complex with significant overhead.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
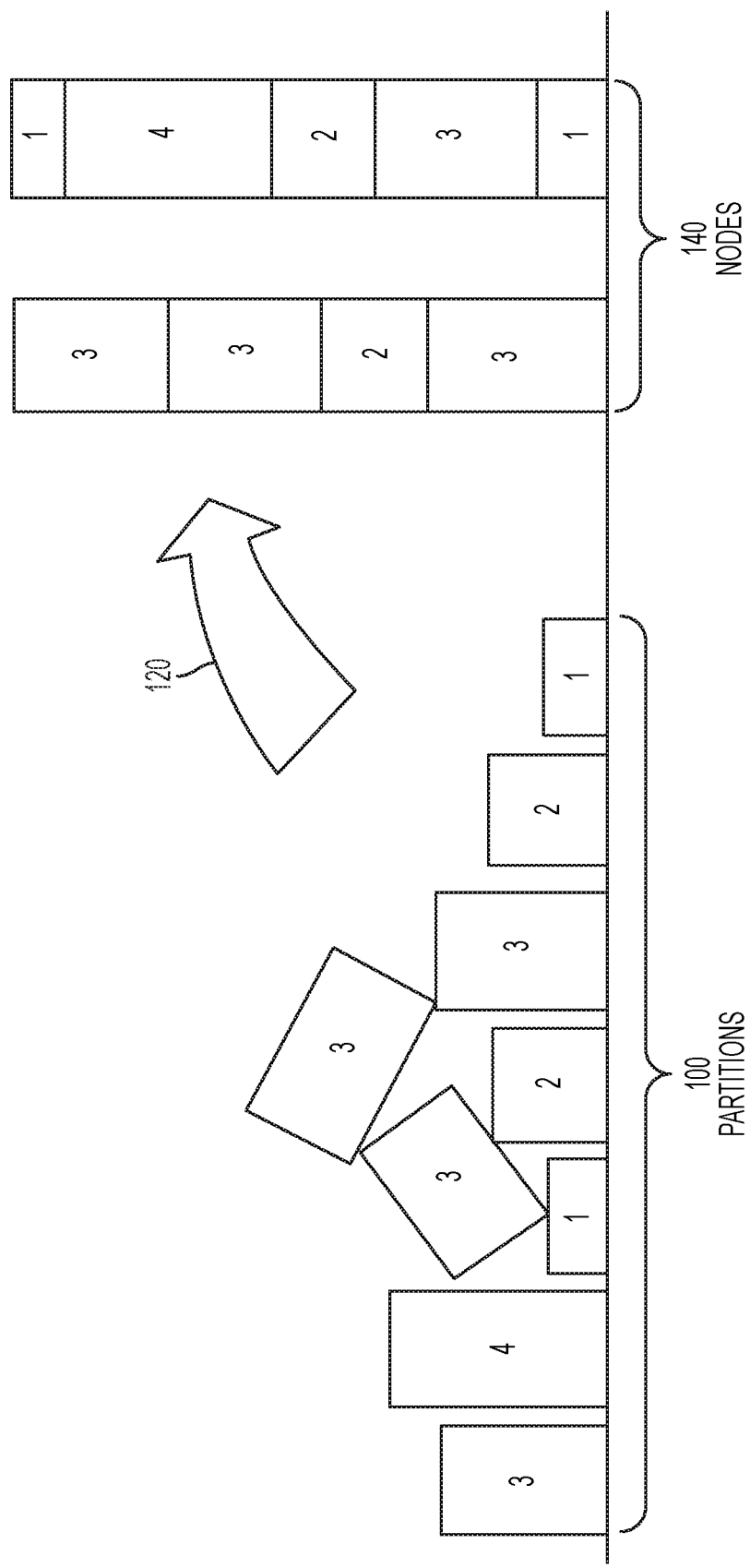
FIG. 1 is a conceptual illustration of a partition mapping problem.

In the following description, numerous specific details are set forth. However, embodiments of the invention may be practiced without these specific details. In other instances, well-known structures and techniques have not been shown in detail in order not to obscure the understanding of this description.

In traditional multi-organizational, node-based architectures utilizing partitions, only organization-level and/or node-level database metrics were available. This made managing of partitions less efficient and resulted in a sub-optimal architecture. Described herein are techniques to group organization-level metrics in an aggregated manner to provide partition-level metrics that can be utilized to manage the multi-organization environment at the partition level.

In various embodiments, organization-level metrics can be gathered by native database tools and/or by utilizing tools external to the database management system. In one embodiment, these external tools can function to capture, index and correlate real-time data in a searchable repository that can be utilized to generate the desired metrics. On example tool that can be utilized for this purpose in SPLUNK™ available from Splunk Inc. of San Francisco, Calif. SPLUNK™ is a trademark of Splunk Inc. Other tools could also be used to generate the desired metrics.

In some embodiments, system and network specific information can be gathered to generate the desired metrics. For example, the status of network services, network servers and/or other network hardware can be utilized. In one embodiment, the network status information can be gathered by a tool such as Argus, which is an open source software tool. Other tools could also be used to generate the desired metrics.

In the description that follows, specific requirements are provided in order to describe one embodiment; however, the techniques and architectures herein can be expanded or contracted to be applicable to systems of any size. In one embodiment, database traffic corresponding to each organization in a multi-organization (multi-org) environment is assigned to a partition (e.g., one of 32 partitions, one of 64 partitions, one of 8 partitions). In one embodiment, each partition is assigned to a database node (e.g., one of 8 nodes, one of 12 nodes). Nodes can be implemented, for example, ORACLE™ Real Application Clusters (RAC), which allows multiple computers to run the database management system simultaneously while accessing a single database.

As described in greater detail below, the system attempts to distribute the load (e.g., traffic, resource consumption) as evenly between nodes as possible. This can be accomplished by managing the system at the partition level. As a simplified analogy, if there is a group of 32 people (e.g., partitions) and 12 scales (e.g., nodes), the manager (e.g., system) attempts to assign each person to a scale so the total weight for each scale is as balanced as possible.

Continuing with the example above, the number of ways to partition a set of N objects in K non-empty subsets is $3 \times 10^{25}$ (30,748,534,496,289, 375,534,223,546 or 30 Septillion). Thus, managing database traffic and/or other resource consumption can quickly become very complex.

FIG. 1 is a conceptual illustration of a partition mapping problem. FIG. 1 illustrates a group of partitions 100 where the number in the partition indicates the "size" or "weight" of the partition. This can be an indication of, for example, the expected level of database traffic. Partitions 100 are evaluated and mapped (120) to nodes 140. The resulting mapping should be equivalent or as near to equivalent as possible.

In general, the distribution of partitions among available nodes is treated as a nondeterministic polynomial time (NP) complete (NP Complete, NP-C) problem. In various embodiments, multiway partitioning can be accomplished utilizing one or more of the Greedy Algorithm, the Karmarkar-Karp Algorithm, Sequential Number Partitioning and/or Reverse Number Partitioning.

Described in greater detail below is a Partition Rebalance Recommendation system that analyzes the partitions of a given node and supplies mapping recommendations to improve distribution of organization workload. In one embodiment, these recommendations take multi-node partitions into account and can be run on multiple metrics (e.g., database traffic, bandwidth consumption, memory utilization, processor usage). In one embodiment, this system is designed to work with complete rebalances, where partitions are assigned to any given node, and partial rebalances, where select partitions are moved from their original nodes to a new node on the given pod (in order to limit transfer of cached data). In one embodiment, a proactive alert system is also provided that alerts users of pods where customer workload distribution can be improved with a rebalance.

In one embodiment, in order to ensure smooth customer experiences, customer workloads are distributed as evenly as possible among the nodes of a given pod. As customer workload grows or shrinks, nodes eventually become unbalanced and can benefit from partition movement to address this uneven distribution of workload. If, for example, a given customer's workload grows too large, their data can be routed to two or more nodes (resulting in a Multi-Node Partition). If workload distributions are not properly rebalanced nodes will become overloaded and result in potential performance impacts. In serious cases an overloaded a node may crash, causing its traffic to be routed to a spare node or distributed among the remaining nodes, both of which will cause performance impacts.

As described in greater detail below, various embodiments can be designed to provide necessary information regarding partition to node rebalances in order to address constant change in customer workload. By providing statistical information, along with mapping recommendations, this relieves the need for constant analysis and reduces the number of future remappings. Contributions to the partition to node rebalance problem, involving workload distribution can include, for example, a metric (or metrics) to quantify distribution of workloads on nodes of a pod, allowing for mapping and comparison analysis; heuristic-based mechanisms for distributing partitions to nodes on a pod, based on workload and disregarding previous assignments; heuristic-based mechanisms for rebalancing existing partition-to-node mappings based on workload, utilizing incremental moves to improve mappings; mechanisms to provide rebalance optimizations based on any provided metric, and extendable to optimization on multiple metrics; multi-node support, allowing rebalance recommendations on pods where partition data may be routed to multiple nodes; and proactive analysis of current partition-to-node mapping, providing recommendations for pods where further optimizations can improve workload distribution.

Figure 2:
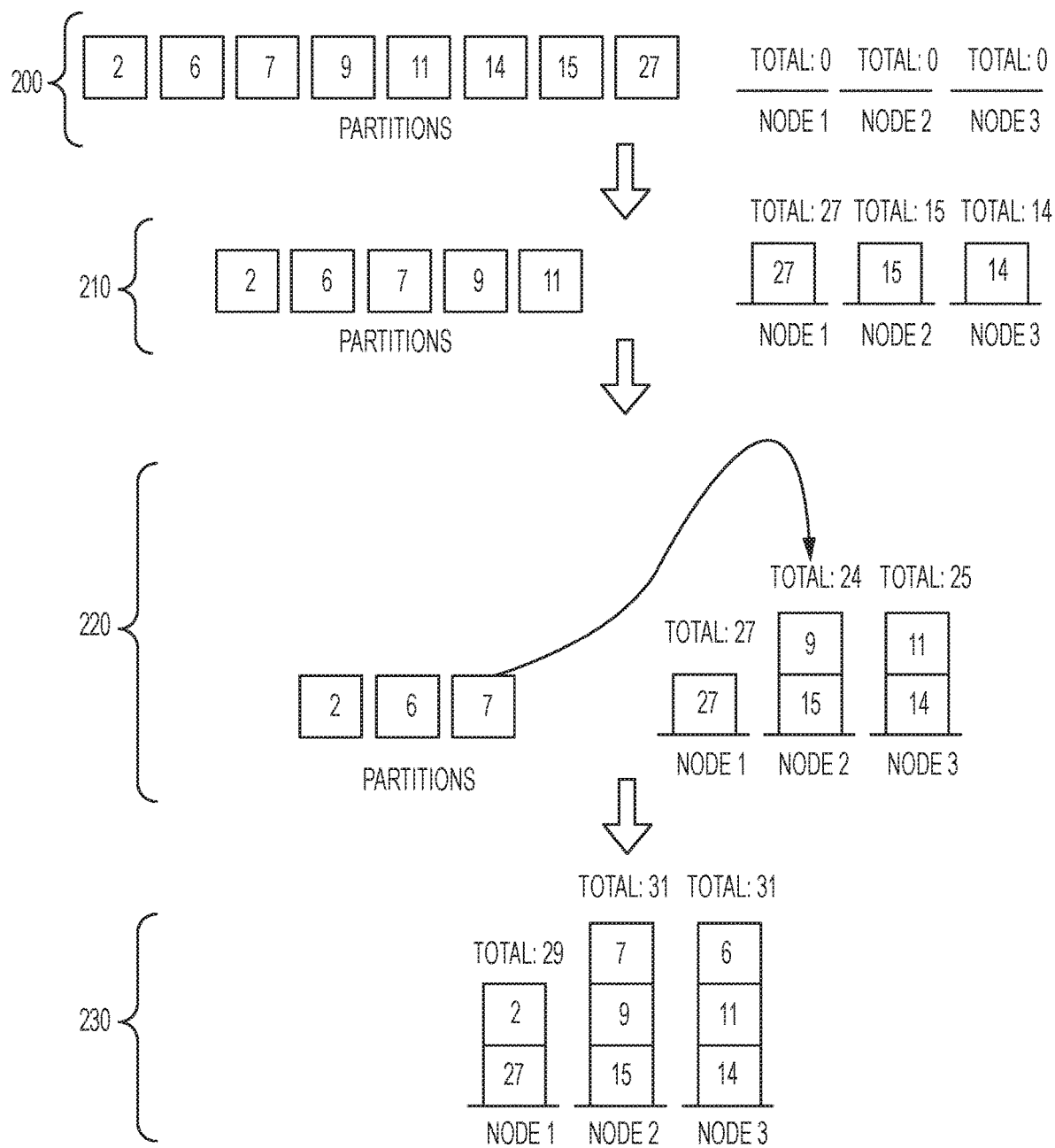
FIG. 2 is a conceptual illustration of a partition mapping result.

FIG. 2 is a conceptual illustration of a partition mapping result. The example of FIG. 2 illustrates eight partitions having different "weights" (2, 6, 7, 9, 11, 14, 15 and 27) to be mapped to three available nodes. In beginning stage 200, the nodes are empty because no partitions have been mapped to any of the nodes.

In one embodiment, in stage 210 for X nodes, the X largest partitions are assigned to a node. Thus, in the example of FIG. 2 partitions with the three highest weights (27, 15 and 14) are mapped to the three available nodes.

In one embodiment, in stage 220 for the lightest X-1 nodes, the heaviest partitions (11 and 9) are assigned to the nodes with the lightest overall weight (Node 3 and Node 2, respectively). The process continues until all partitions have been assigned to a node, stage 230.

Figure 3:
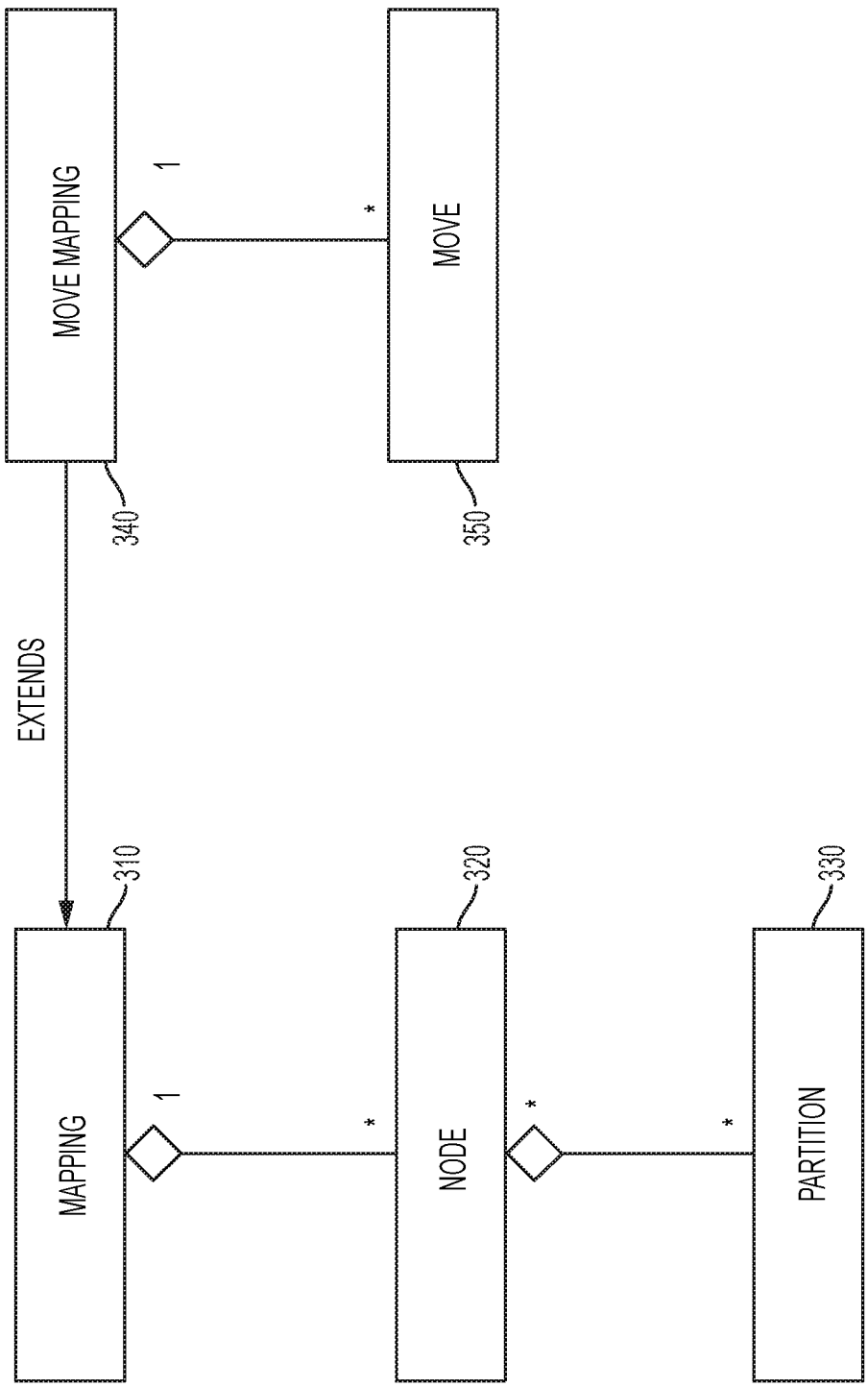
FIG. 3 provides a conceptual illustration of the relationships between mappings, move mappings, moves, nodes and partitions.

FIG. 3 provides a conceptual illustration of the relationships between mappings, move mappings, moves, nodes and partitions. In general, partitions (330) has associated partition metrics that can be any type of metric(s) (e.g., database traffic, cache usage, processor usage, number of users) can be utilized for partition mapping. In one embodiment, a partition is a database partition, which is a division of a logical database (and/or constituent parts).

In one embodiment, each node (320) in the system can host one or more partitions. As described herein, partitions can be mapped to nodes and the mapping of partitions to nodes can be updated/changed based on various conditions. In one embodiment, a mapping (310) represents a partition-to-node mapping and can be represented by a data structure that is utilized by a database management system (or other management system). In one embodiment, the mapping structure can store associated metrics that can be used to analyze mappings, for example, standard deviations, variances, means, ranges, and/or other statistical information.

In one embodiment, a move (350) is used to represent a partition move from one node to another. For example, a data structure that stores a partition identifier, a from node and a to node can be utilized to represent the move. Additional associated data can be stored to analyze the move (or potential move). In one embodiment, a move mapping (340) functions to update a corresponding mapping (310) when new moves are added and can store moves necessary to get to the current state of the system.

In one embodiment, "mappings" can be utilized to store metric data and/or partition-to-node mappings. The partition-to-node mappings can be based on one or more metrics. In one embodiment, the system can calculate a metric total for each node and used these totals to determine a standard deviation of the mapping(s). Utilizing standard deviations of the mappings is one mechanism that can be used to compare different mappings and the results from different partition moves. In one embodiment, "move mappings" can be utilized to store extra data about moves used to get to the current state.

In one embodiment, when performing a complete rebalance, a greedy strategy can be utilized. In this embodiment, an optimal mapping is determined regardless of previous mappings. In one embodiment, the system determines the node with the lowest metric total and then adds the partition with the largest metric value to it. It then updates the node totals and repeats. Thus, it continually attempts to rebalance the nodes by adding partitions to the smallest node until all partitions are assigned.

In one embodiment, when performing a partial rebalance, the system can function to find an optimal mapping based on a previous mapping and one or more move constraints. This strategy targets the node with the largest metric total and the node with the smallest metric total. Mapping variances (e.g., standard deviation and range) are used to determine a best mapping.

Figure 4:
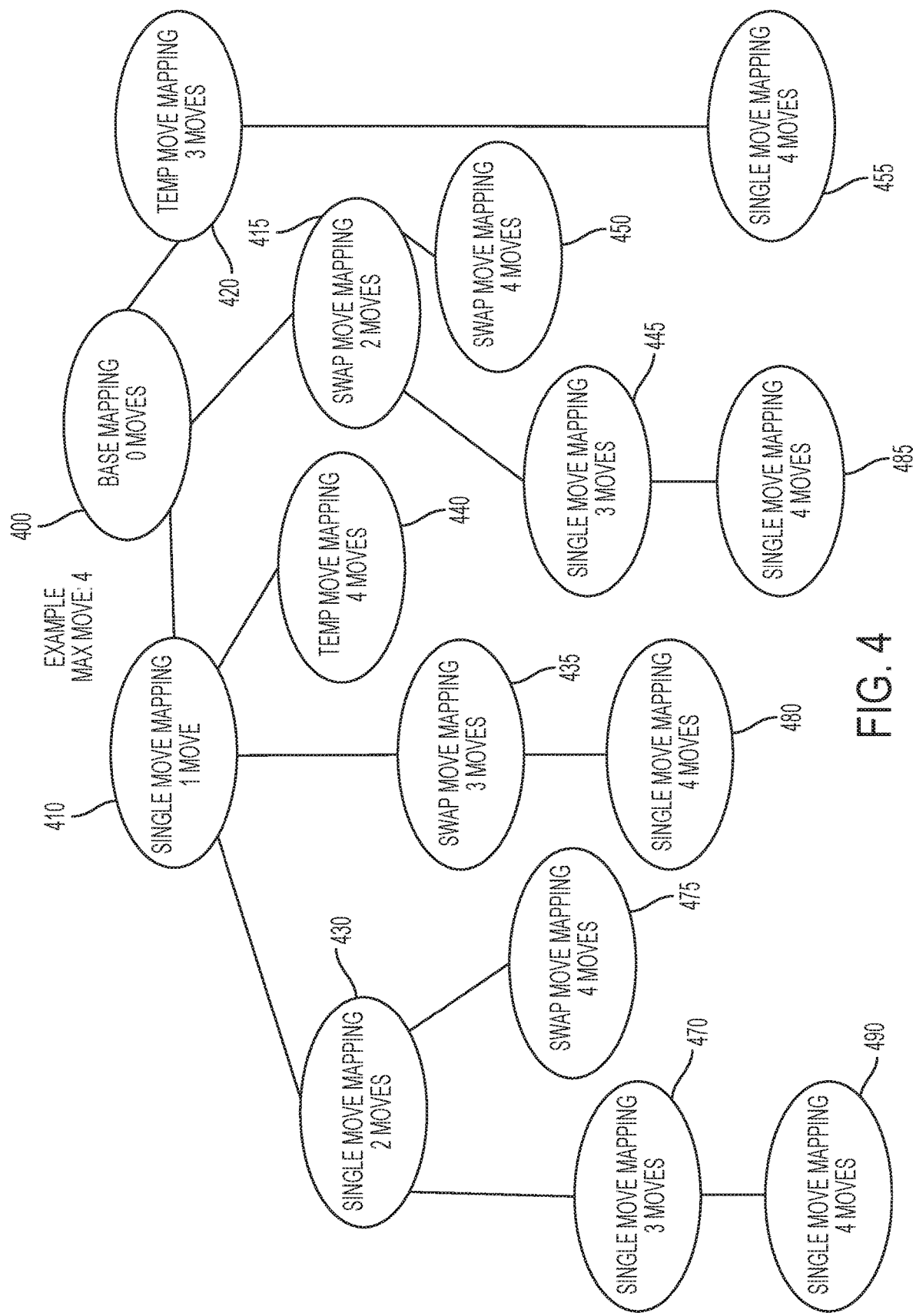
FIG. 4 conceptually illustrates a move tree with a move constraint of four.

FIG. 4 conceptually illustrates a move tree with a move constraint of four. A move constraint of four is just one example; any move constraint value can be supported. The tree structure of FIG. 4 illustrates the combinations of moves that exist within the move constraint that are available to use in remapping partitions among nodes. In the example of FIG. 4, base mapping (400) corresponds to the current partition-to-node mappings. Thus, no moves are necessary to achieve the base mapping.

With a single partition move (410) one of the available four moves is utilized to remap partitions. This can be, for example, moving one partition from an original (source) node to a target (destination) node. With a swap move (415) two of the available four moves are utilized. This can be, for example, moving a first partition from a first node to a second node and moving a second partition from the second node to the first node. With a temp move (420) three of the available four moves are utilized. This can be, for example, moving a partition from a first node to a temporary location, moving a second partition to the temporary location to be merged with the first node and then moving the combined partition to a source node.

Combinations of moves can also be utilized in remapping of partitions to nodes. For example, two single moves (430), a single move (410) and a swap move (435), a single move (410) and a temp move (440). Further options include, for example, a swap move (415) and then a single move (445), a swap move (415) and then another swap move (450), a temp move (420) followed by a single move (455). Even move complex combinations can also be utilized, for example, three single moves (470), two single moves (430) and a swap move (475), a single move (410), swap move (435) and another single move (480), a swap move (415) followed by single move (445) and single move (485), or single move (430) followed by single move (470) and four single moves (490).

Figure 5:
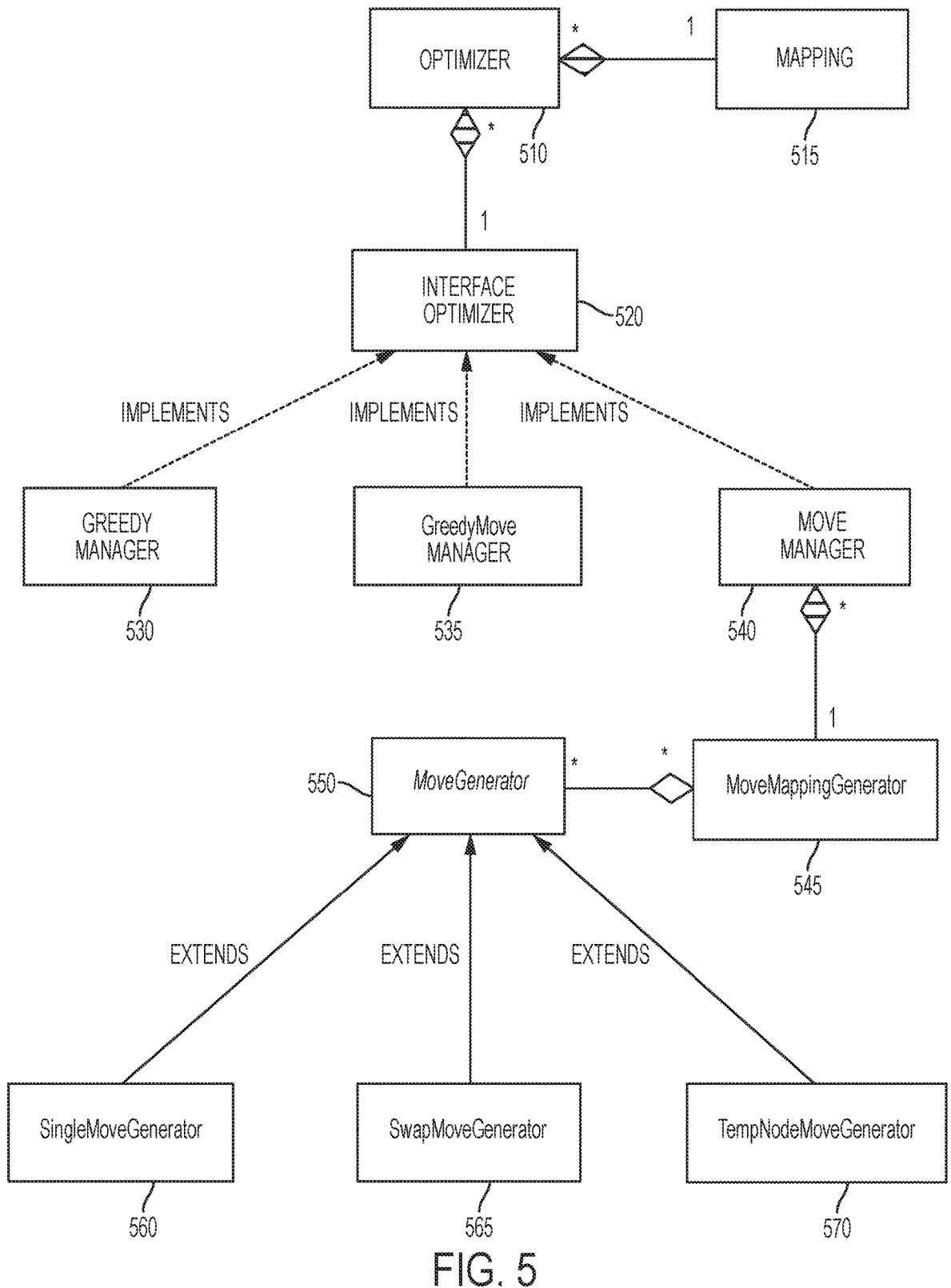
FIG. 5 conceptually illustrates one embodiment of a relationship between entities to provide optimized mapping as described herein.

FIG. 5 conceptually illustrates one embodiment of a relationship between entities to provide optimized mapping as described herein. In one embodiment, optimizer 510 operates on mapping 515 using one or more mapping strategies to determine an optimized (or selected) mapping (or remapping) of partitions to nodes within a multi-node environment.

In one embodiment, optimizer 510 operates through optimizer interface 520 to receive input from one or more mangers (or agents) that can provide mapping information based on various mapping strategies. In one embodiment, greedy manager 530 operates using a greedy strategy to map partitions to nodes. In one embodiment, greedy manager 530 does not take previous mapping(s) into consideration, but only uses current partition data. In one embodiment, greedy manager operates to place the partition with the highest metric value (e.g., partition database traffic) into the node with the smallest total metric value. This is continued until all partitions are mapped.

In one embodiment, move manager 540 operates to find an optimal mapping based on a previous mapping and a move constraint (e.g., FIG. 4). In one embodiment, single move generator 560 functions to move a single partition from the largest node to the smallest node, swap move generator 565 operates to swap a partition from a largest node to a smallest node, and temp node move generator 570 uses a temporary third node to move a partition from the largest node to the temporary node and then move smaller partitions from the temporary node to both the smallest and largest node.

In one embodiment, move generator 550 receives moves to be evaluated from single move generator 560, swap move generator 565 and/or temp node move generator 570. In one embodiment, move mapping generator 545 receives move information from move generator 550 and adds the move information to the queue of mappings to be evaluated. In one embodiment, move manager 540 evaluates the moves within the move constraint as discussed above.

In one embodiment, greedy move manager 535 utilizes results from greedy manager 530 and move manager 540 and further optimizes those results to provide a composite of the strategies applied by greedy manager 530 and move manager 540. In one embodiment, greedy move manager 535 applies the strategies of move manager 540 to results generated by greedy manager 530.

In one embodiment, a queue of potential mappings is generated with the original (base) mapping as the first element of the queue. While there are still mappings left in the queue, the first mapping is popped off and that mapping is passed to a move mapping generator (described in greater detail below). The variances of the individual mapping are evaluated to determine if any of the generated mappings have a variance smaller than the current best mapping. If so, the best mapping is updated to the one with the smallest variance(s) and all generated mappings can be added back to the queue regardless of whether they improved the variance, if they have not already been analyzed.

In one embodiment, this process continues while mappings remain in the queue. In one embodiment, if a mapping that cannot be further optimized is found, the process can be halted. In one embodiment, the move mapping generator operates to generate all of the possible moves to be analyzed.

In one embodiment, before the optimization process begins, the nodes that cannot be optimized can be eliminated from the optimization process. In one embodiment, this can be accomplished by sorting nodes in descending order of metric totals. If the largest node has only one partition (or only one non-zero partition), that node can be considered optimized and can be removed from the optimization process. The next largest node can be similarly evaluated, and so on.

In one embodiment, after the nodes that cannot be optimized have been eliminated, the remaining nodes can be evaluated to determine if the metric standard deviation/range is greater than zero. If no further optimization is possible, the previous mapping is considered the best possible mapping.

In one embodiment, if a mapping can be further optimized, a variety of move generation analyses can be performed resulting in a list of potential move mappings. In one embodiment, one or more movement strategies can be applied to the mapping(s) to generate potential mappings for evaluation. In one embodiment, move generation strategies can target the node with the largest metric total and the node with the smallest metric total, as these nodes have the largest impact on mapping variance.

Figure 6:
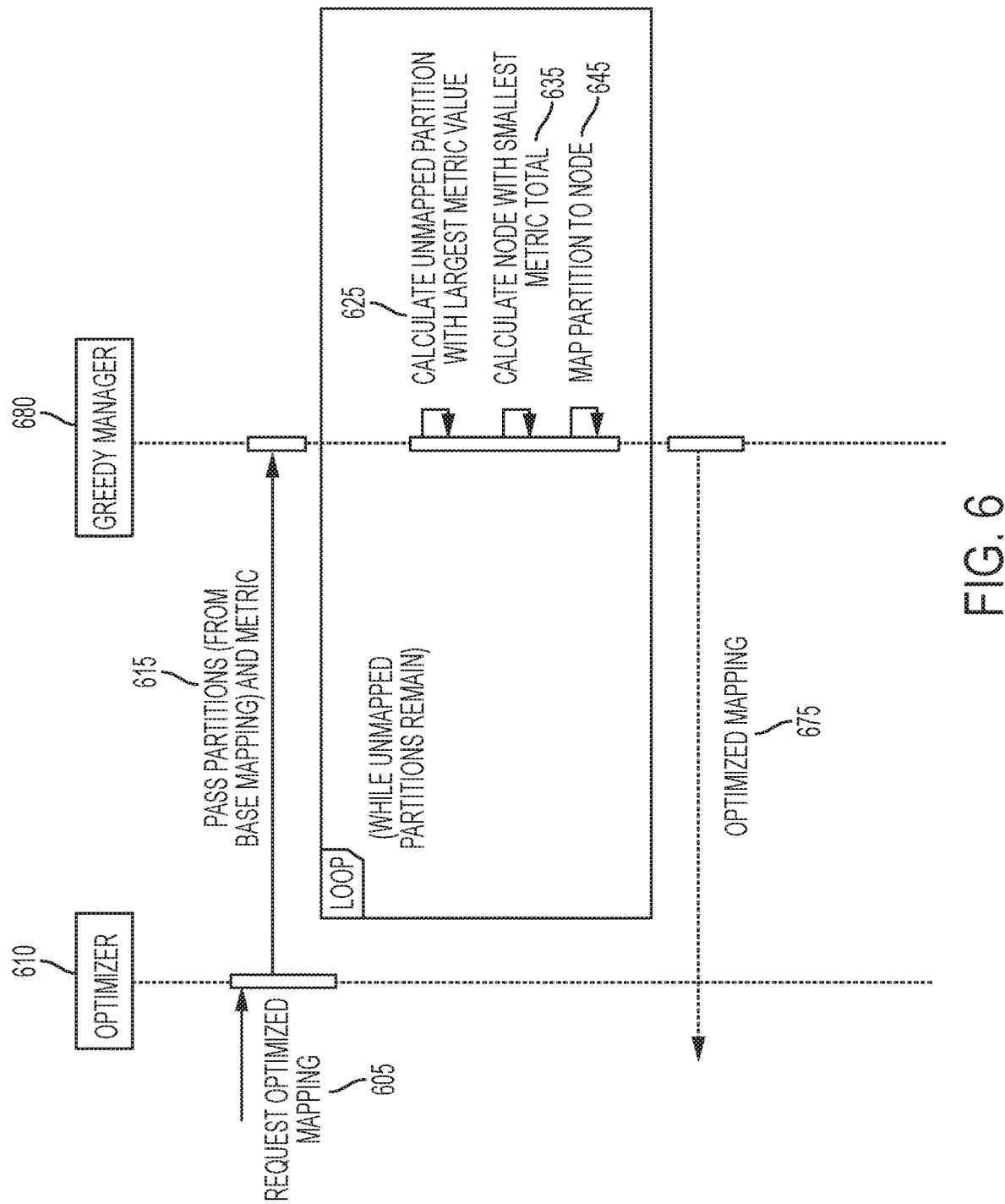
FIG. 6 is a flow diagram corresponding to a greedy mapping strategy.

FIG. 6 is a flow diagram corresponding to a greedy mapping strategy. In one embodiment, optimizer 610 receives request for optimized mapping, 605. In response to the request, optimizer 610 passes partitions from the base mapping as well as metric information 615 to greedy manager 680, which operates to generate optimized mappings 675 based on a greedy strategy.

In one embodiment, while unmapped partitions remain, greedy manager 680 performs the following operations. The unmapped partition with the largest metric value is determined, 625. The node with the smallest metric total is determined, 635. The unmapped partition with the largest metric value is mapped to the node with the smallest metric total, 645. The process is repeated for all unmapped partitions.

Figure 7:
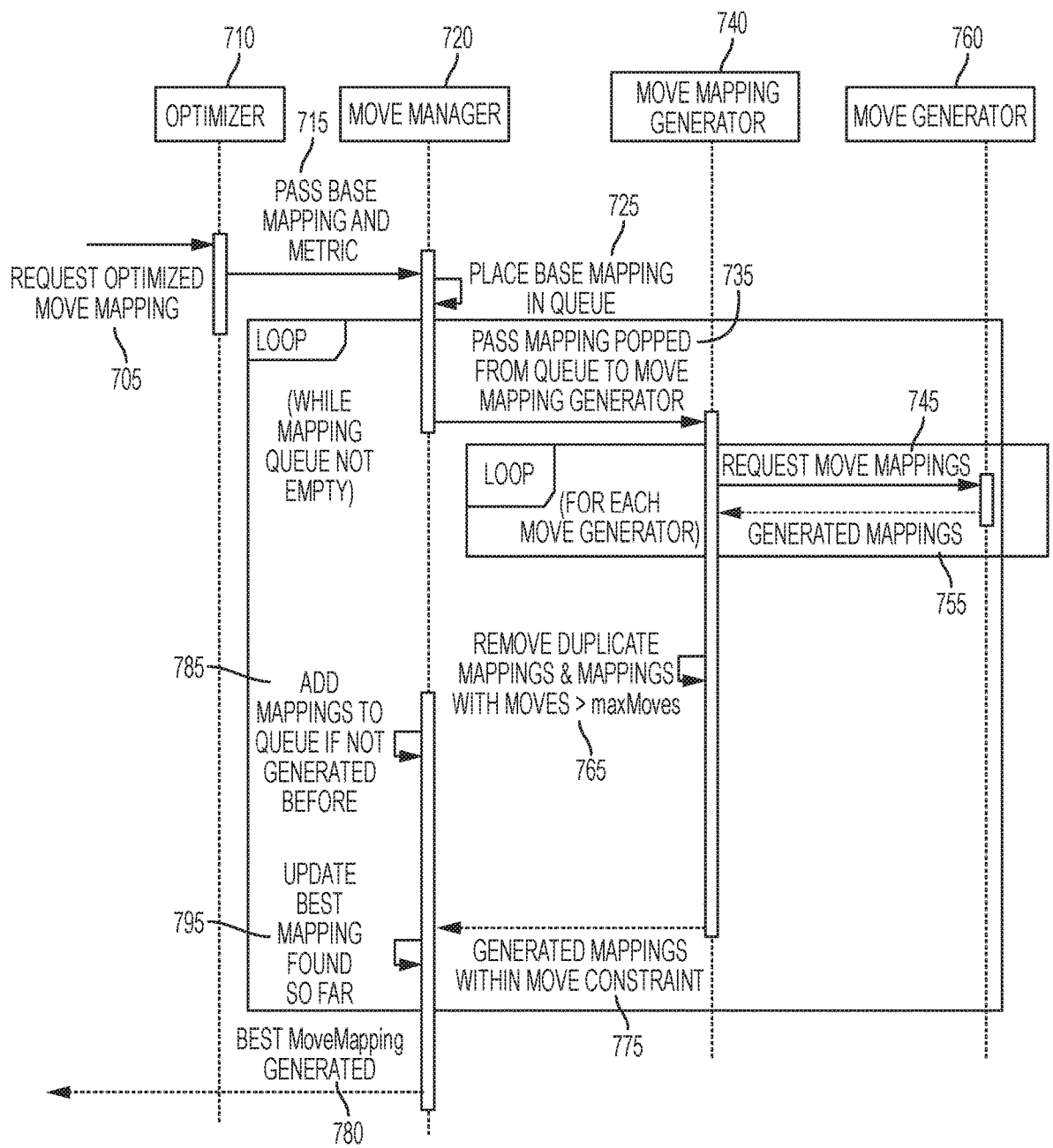
FIG. 7 is a flow diagram corresponding to an optimized mapping strategy.

FIG. 7 is a flow diagram corresponding to an optimized mapping strategy. In one embodiment, optimizer 710 receives request for optimized mapping, 705. In response to the request, optimizer 710 passes the base mapping as well as metric information 715 to move manager 720, which operates to coordinate generation of optimized mappings.

In one embodiment, move manager 720 places the base mapping in a queue 725 that is to be used to optimize partition to node mappings. In one embodiment, the following process as a loop ("outer loop") while the mapping queue is not empty. In one embodiment, the outer loop is run by move manager 720. Move manager 720 pops a mapping from the queue and passes it 735 to move mapping generator 740.

In one embodiment, for each mapping provided to move mapping generator 740, move mappings are requested 745 from move generator 760, and the generated mappings are returned 755 to move mapping generator 740. In one embodiment, move mapping generator 740 operates to remove duplicate mappings and mappings having more moves than allowed (e.g., exceeds move constraints) 765.

In one embodiment, the generated mappings within the relevant move constraints are sent 775 from move mapping generator 740 to move manager 720. In response move manager 720 adds the mappings to the queue if not generated before 785, and updates the best mapping found so far, 795. When the outer loop is complete, move manager 720 sends an indication of the best move mapping 780 to optimizer 710.

Figure 8:
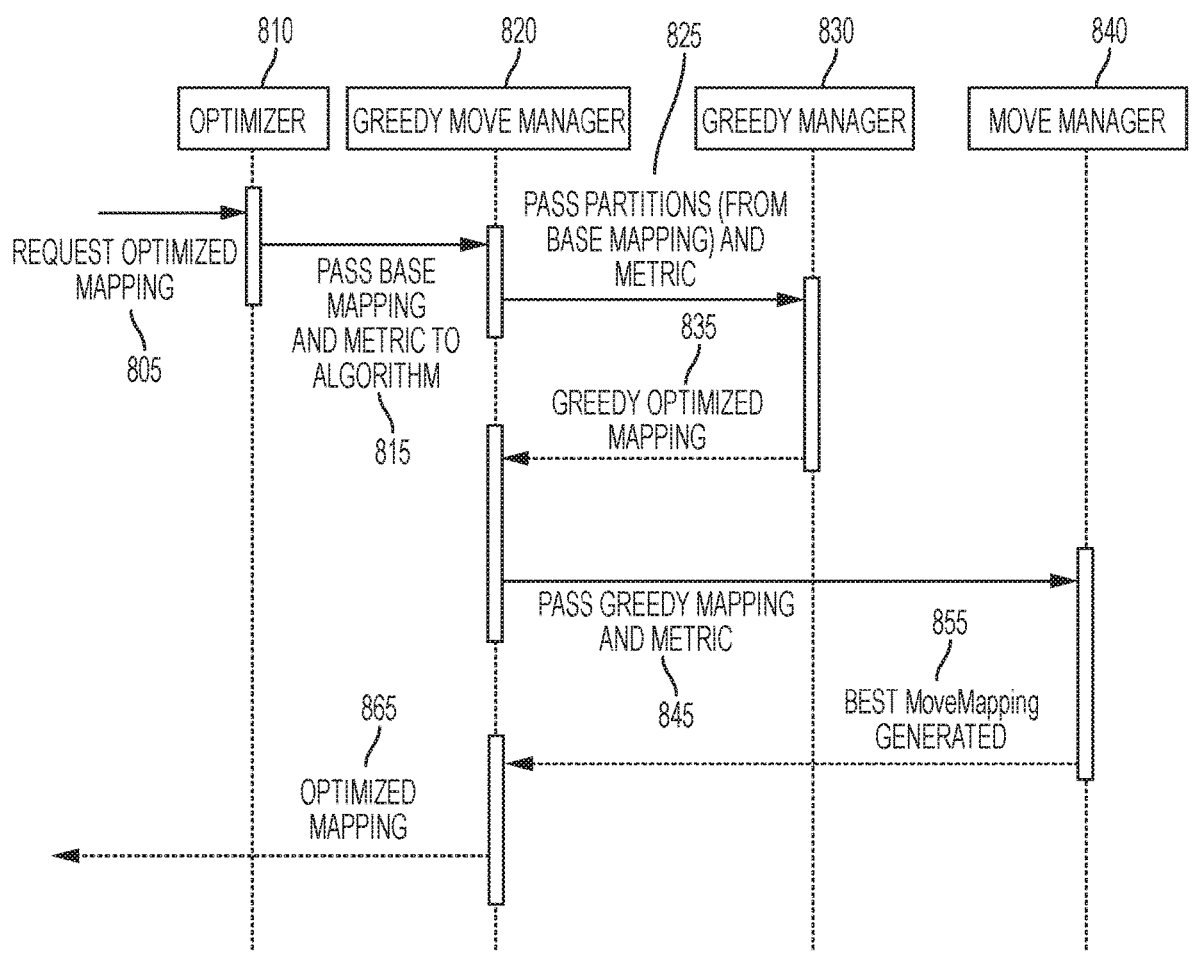
FIG. 8 is a flow diagram corresponding to an optimized mapping strategy.

FIG. 8 is a flow diagram corresponding to an optimized mapping strategy. In one embodiment, optimizer 810 receives request for optimized mapping, 805. In response to the request, optimizer 810 passes the base mapping as well as metric information 815 to greedy move manager 820, which operates to pass 825 partitions from the base mapping and associated metrics to greedy manager 830. In one embodiment, greedy manager 830 generates one or more greedy optimized mappings 835 from the base mapping and sends them back to greedy move manager 820.

In one embodiment, greedy move manager 820 sends one or more greedy move mappings and associated metrics 845 to move manager 840. In one embodiment, move manager 840 determines a best move mapping and sends the selection 855 to greedy move manager 820. In one embodiment, greedy move manager 820 generates the optimized mapping 865 to be used.

Figure 9:
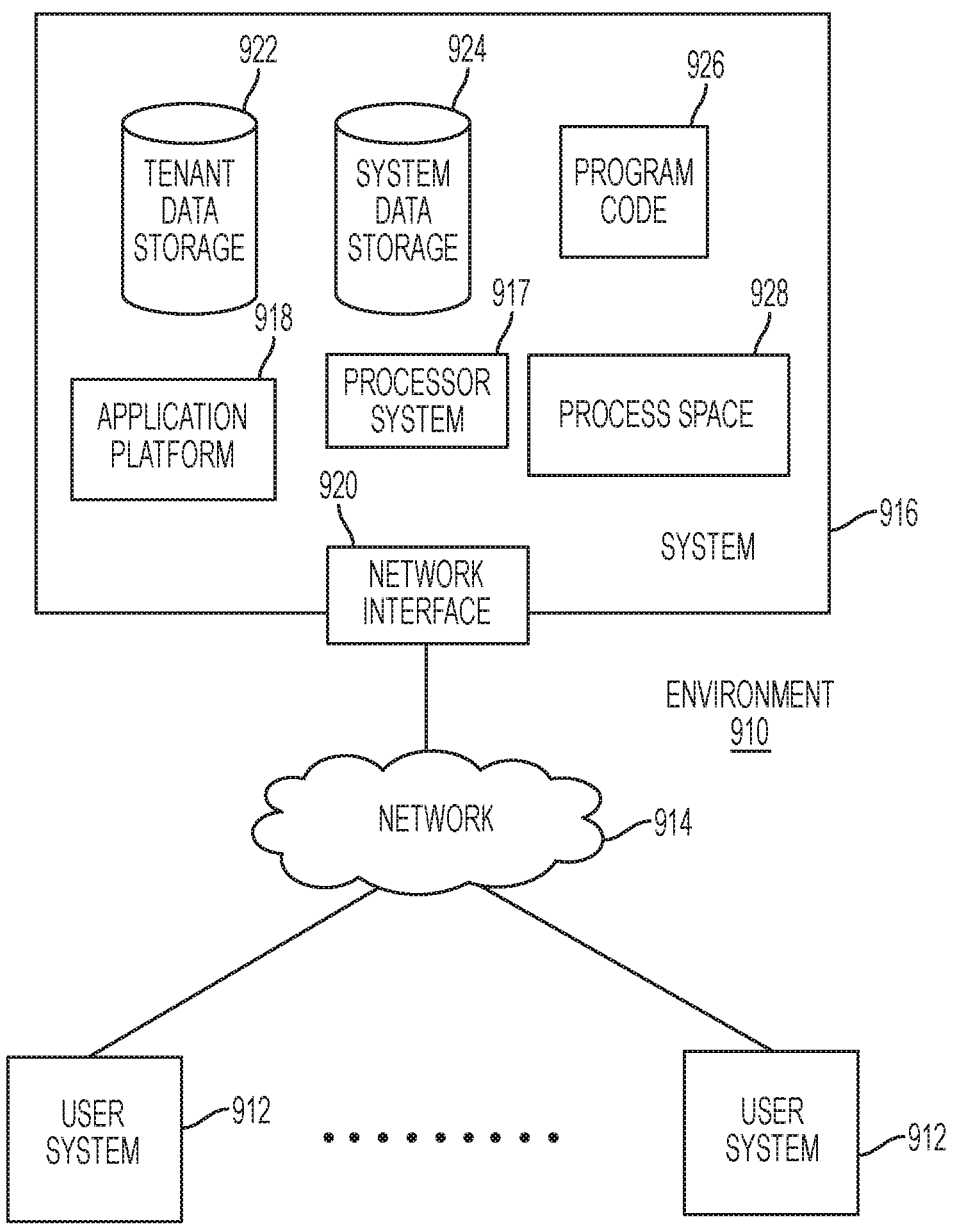
FIG. 9 a block diagram of one embodiment of an environment where an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in herein FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third-party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
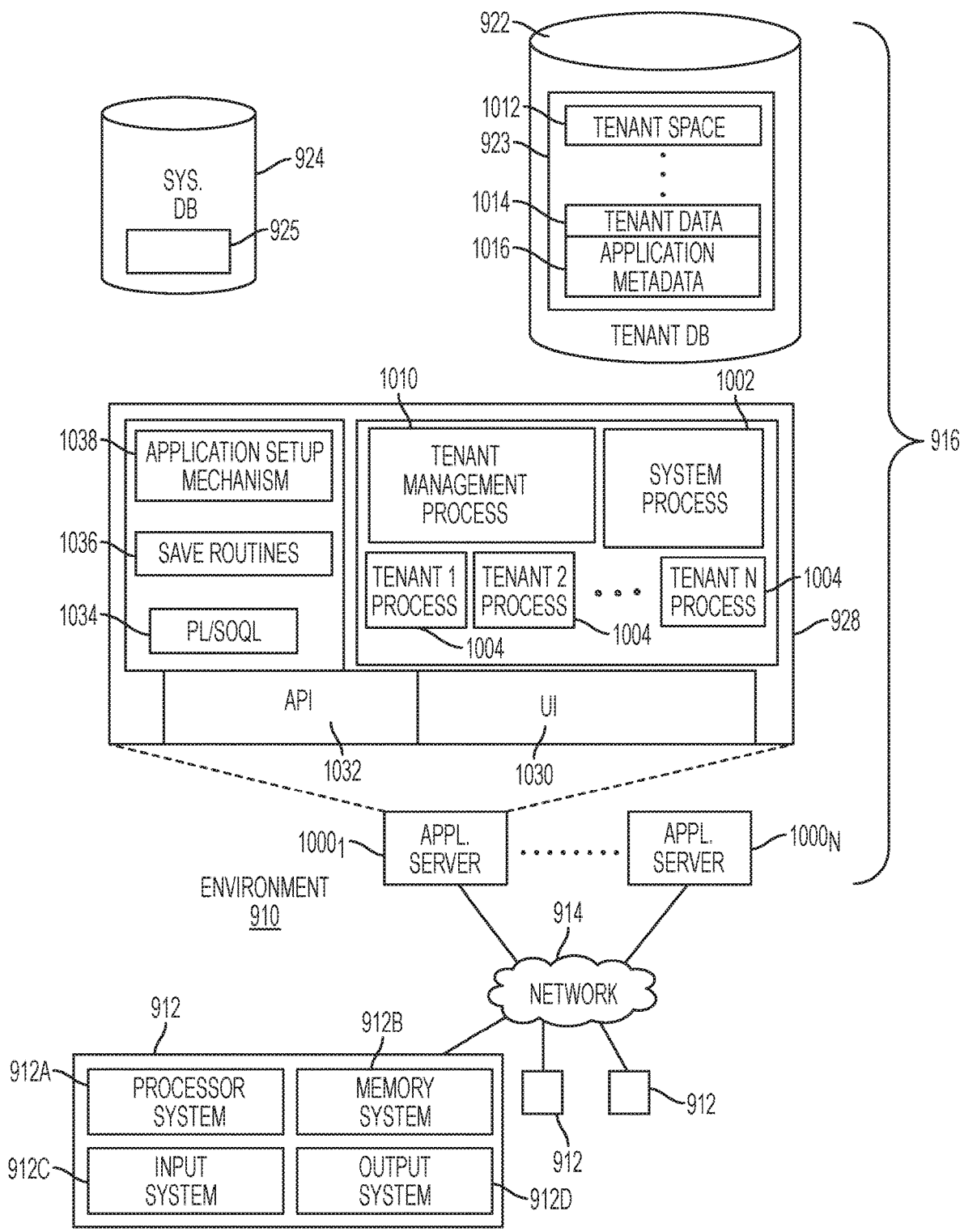
FIG. 10 a block diagram of one embodiment of an environment where an on-demand database service might be used.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 11A:
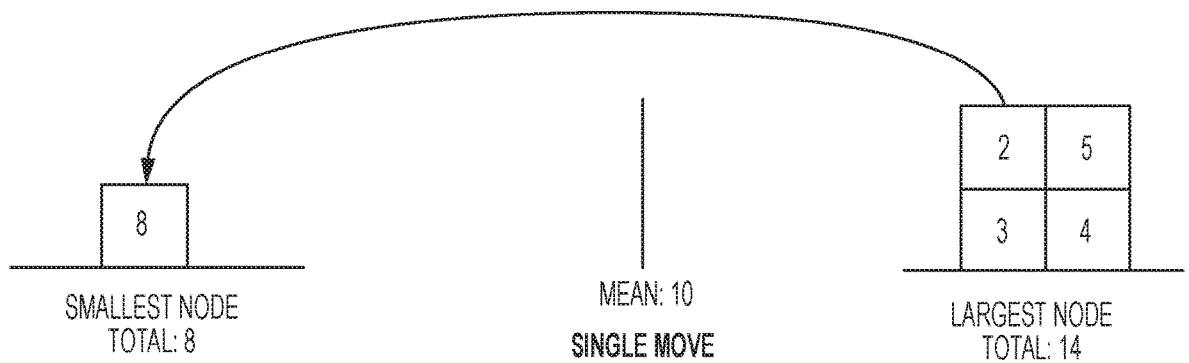
FIG. 11a illustrates an example single partition move.
Figure 11B:
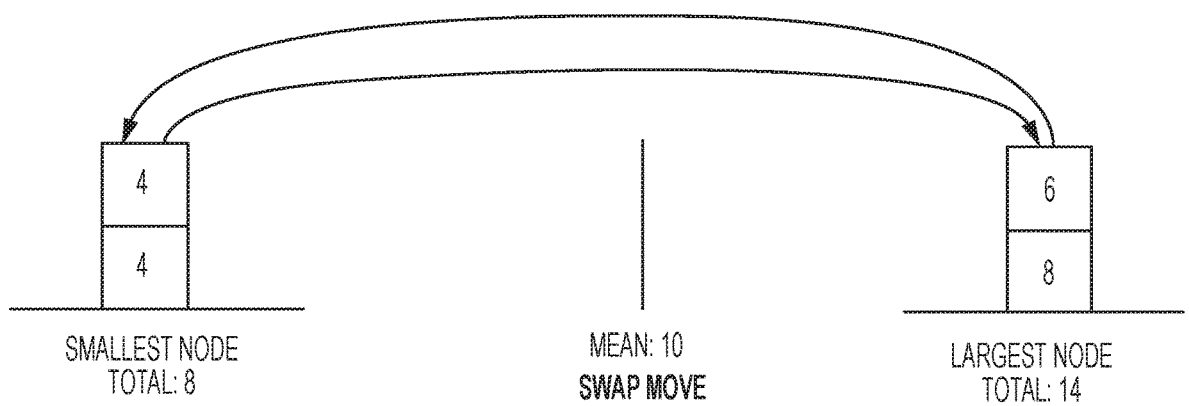
FIG. 11b illustrates an example swap partition move.
Figure 11C:
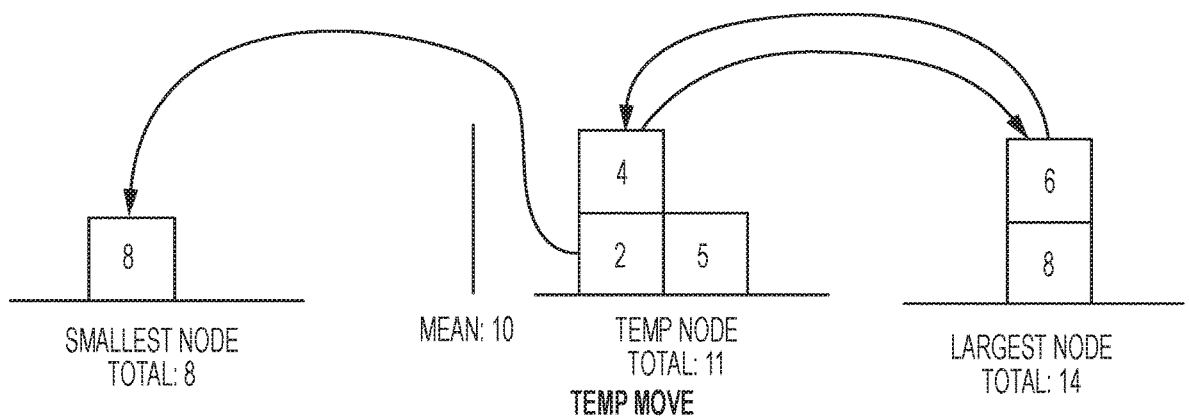
FIG. 11c illustrates an example temp partition move.

FIG. 11*a* illustrates an example single partition move. In the example of FIG. 11*a*, a partition is moved from a largest node to a smallest node. FIG. 11*b* illustrates an example swap partition move. In the example of FIG. 11*b*, a partition from the largest node is swapped with a partition from the smallest node. FIG. 11*e* illustrates an example temp partition move. In the example of FIG. 11*c*, one or more partitions from the largest node and one or more partitions from the smallest node are moved to a temp node and redistributed.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A multi-node system comprising:
at least one physical storage device to store data in a database, the database having multiple nodes and each node having one or more partitions, where a partition is a division of a logical database, the at least one physical storage device further to store metric information related to the partitions of the database;
at least one hardware processor coupled with the at least one physical storage device, the at least one hardware processor configurable to gather node-level database metric information and organization-level metric information related to the partitions, to aggregate the organization-level metric information from multiple organizations to generate partition-level metric information, to evaluate a plurality of potential mappings of partitions to nodes utilizing at least the partition-level metric information, the at least one hardware processor to select one of the potential mappings of partitions to nodes to result in improved metric distribution among the nodes while ensuring that a number of partition moves utilized to achieve the selected mapping is within a pre-selected move constraint that indicates a maximum allowable number of partition movements to achieve the selected mapping.

2. The multi-node system of claim 1 wherein the one or more metrics comprises at least partition database traffic.

3. The multi-node system of claim 1 wherein the one or more metrics comprises at least partition cache usage.

4. The multi-node system of claim 1 wherein the one or more metrics comprises at least partition processor usage.

5. The multi-node system of claim 1 wherein the plurality of potential mappings comprise one or more of a single partition move, a partition swap and a partition temp move.

6. The multi-node system of claim 1 wherein the potential mapping is a result from a greedy placement strategy optimized utilizing an optimized movement strategy.

7. The multi-node system of claim 1 wherein partitions are moved from a largest node to a smallest node based on partition metric standard deviations.

8. The multi-node system of claim 7 wherein partitions are moved from a largest node to a smallest node based on partition metric ranges.

9. A non-transitory computer-readable medium having stored thereon instructions that, when executed by one or more processors to provide a system having at least a database, are configurable to cause the one or more processors to:

store data of the database, the database having multiple nodes and each node having one or more partitions, where a partition is a division of a logical database, the medium further to store metric information related to the partitions of the database gather node-level database metric information and organization-level metric information related to the partitions;

aggregate the organization-level metric information from multiple organizations to generate partition-level metric information;

evaluate a plurality of potential mappings of partitions to nodes utilizing at least the partition-level metric information, the at least one hardware processor;

select one of the potential mappings of partitions to nodes to result in improved metric distribution among the nodes while ensuring that a number of partition moves utilized to achieve the selected mapping is within a pre-selected move constraint that indicates a maximum allowable number of partition movements to achieve the selected mapping; and cause the selected potential mapping to be implemented by moving one or more partitions between one or more nodes.

10. The non-transitory computer-readable medium of claim 9 wherein the one or more metrics comprises at least partition database traffic.

11. The non-transitory computer-readable medium of claim 9 wherein the one or more metrics comprises at least partition cache usage.

12. The non-transitory computer-readable medium of claim 9 wherein the one or more metrics comprises at least partition processor usage.

13. The non-transitory computer-readable medium of claim 9 wherein the plurality of potential mappings comprise one or more of a single partition move, a partition swap and a partition temp move.

14. The non-transitory computer-readable medium of claim 9 wherein the potential mapping is a result from a greedy placement strategy optimized utilizing an optimized movement strategy.

15. The non-transitory computer-readable medium of claim 9 wherein partitions are moved from a largest node to a smallest node based on partition metric standard deviations.

16. The non-transitory computer-readable medium of claim 15 wherein partitions are moved from a largest node to a smallest node based on partition metric ranges.

17. A computer-implemented method within a system having at least a database configured to have multiple nodes, each node having one or more partitions where a partition is a division of a logical database, the method comprising:

storing data of the database, the database having multiple nodes and each node having one or more partitions, where a partition is a division of a logical database, a memory device further to store metric information related to the partitions of the database gathering node-level database metric information and organization-level metric information related to the partitions;

aggregating the organization-level metric information from multiple organizations to generate partition-level metric information;

evaluating a plurality of potential mappings of partitions to nodes utilizing at least the partition-level metric information, the at least one hardware processor;

selecting one of the potential mappings of partitions to nodes to result in improved metric distribution among the nodes while ensuring that a number of partition moves utilized to achieve the selected mapping is within a pre-selected move constraint that indicates a maximum allowable number of partition movements to achieve the selected mapping; and causing the selected potential mapping to be implemented by moving one or more partitions between one or more nodes.

18. The method of claim 17 wherein the one or more metrics comprises at least partition database traffic.

19. The method of claim 17 wherein the one or more metrics comprises at least partition cache usage.

20. The method of claim 17 wherein the one or more metrics comprises at least partition processor usage.

21. The method of claim 17 wherein the plurality of potential mappings comprise one or more of a single partition move, a partition swap and a partition temp move.

22. The method of claim 17 wherein the potential mapping is a result from a greedy placement strategy optimized utilizing an optimized movement strategy.

23. The method of claim 17 wherein partitions are moved from a largest node to a smallest node based on partition metric standard deviations.

24. The method of claim 23 wherein partitions are moved from a largest node to a smallest node based on partition metric ranges.

* * * * *